United States Patent [19]
Castro

[11] Patent Number: 5,237,210
[45] Date of Patent: Aug. 17, 1993

[54] NEURAL NETWORK ACCOMODATING PARALLEL SYNAPTIC WEIGHT ADJUSTMENTS FOR CORRELATION LEARNING ALGORITHMS

[75] Inventor: Hernan A. Castro, Shingle Springs, Calif.

[73] Assignee: Intel Corporation, Santa Clara, Calif.

[21] Appl. No.: 851,289

[22] Filed: Mar. 12, 1992

[51] Int. Cl.$^5$ .............................................. G06F 7/00
[52] U.S. Cl. ...................................... 307/201; 395/24
[58] Field of Search ..................... 307/201; 395/23-25

[56] References Cited

U.S. PATENT DOCUMENTS

| | | | |
|---|---|---|---|
| 4,904,881 | 2/1990 | Castro | 307/201 |
| 4,906,865 | 3/1990 | Holler | 307/201 X |
| 4,950,917 | 9/1990 | Holler et al. | 307/201 |
| 4,956,564 | 9/1990 | Holler et al. | 307/201 |
| 4,961,002 | 10/1990 | Tam et al. | 307/201 |
| 5,021,693 | 6/1991 | Shima | 307/201 X |
| 5,040,134 | 8/1991 | Park | 395/24 |
| 5,053,638 | 10/1991 | Furutani et al. | 395/24 X |
| 5,101,361 | 3/1992 | Eberhardt | 395/24 |
| 5,146,542 | 9/1992 | Engeler | 307/201 X |

OTHER PUBLICATIONS

Mackie, et al., "Implementations of Neural Network Models in Silicon"; Oct., 1987.
Lippman, R., "An Introduction to Computing with Neural Nets"; IEEE ASSP, Apr. 1987.
Hopfield, et al., "Computing with Neural Circuits: A Model"; Science, Aug., 1986.
Graf, et al., "Analog Electronic Neural Network Circuits"; IEEE Circuits and Devices, Jul. 1989.

Primary Examiner—David R. Hudspeth

[57] ABSTRACT

A neural network providing correlation learning in a synapse cell coupled to a circuit for parallel implementation of weight adjustment in a broad class of learning algorithms. The circuit provides the learning portion of the synaptic operation and includes a pair of floating gate devices sharing a common floating gate member that stores the connection weight of the cell. Parallel weight adjustments are performed in a predetermined number of cycles utilizing a novel debiasing technique.

19 Claims, 6 Drawing Sheets

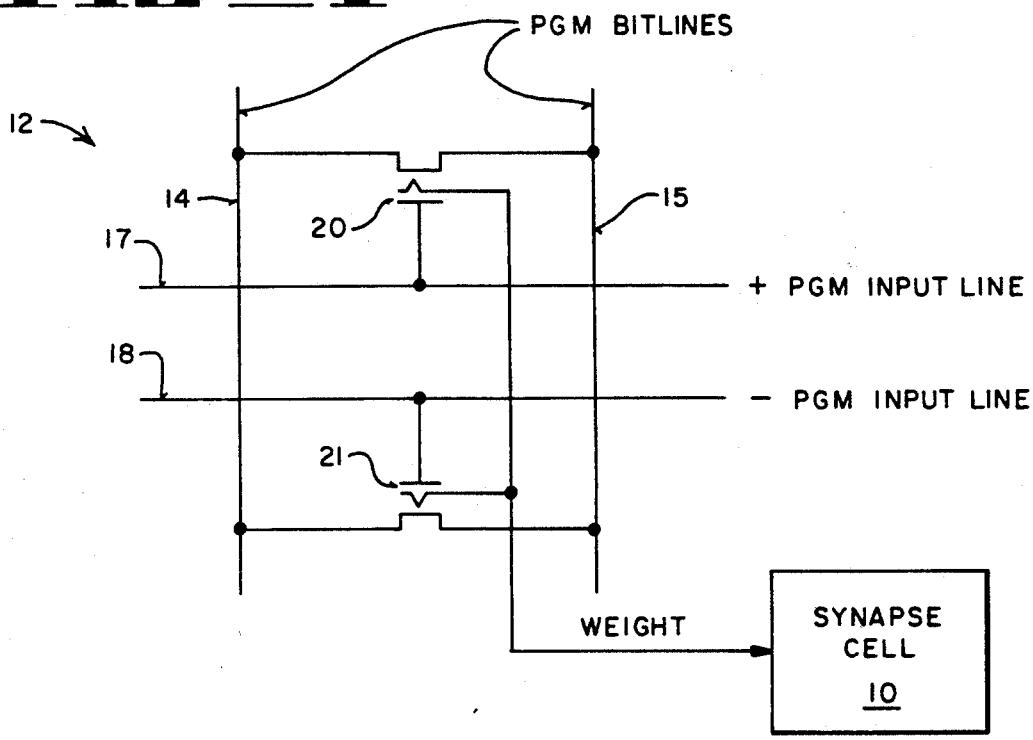
FIG_1
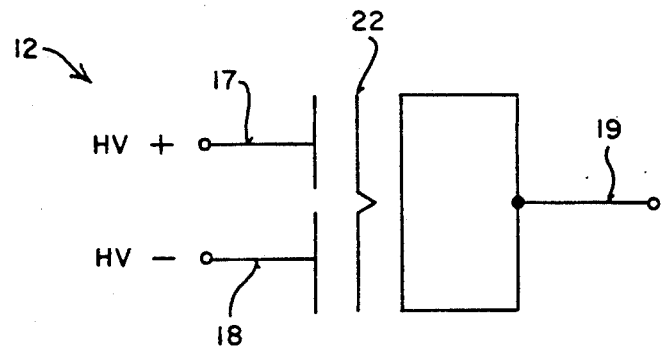
FIG_2

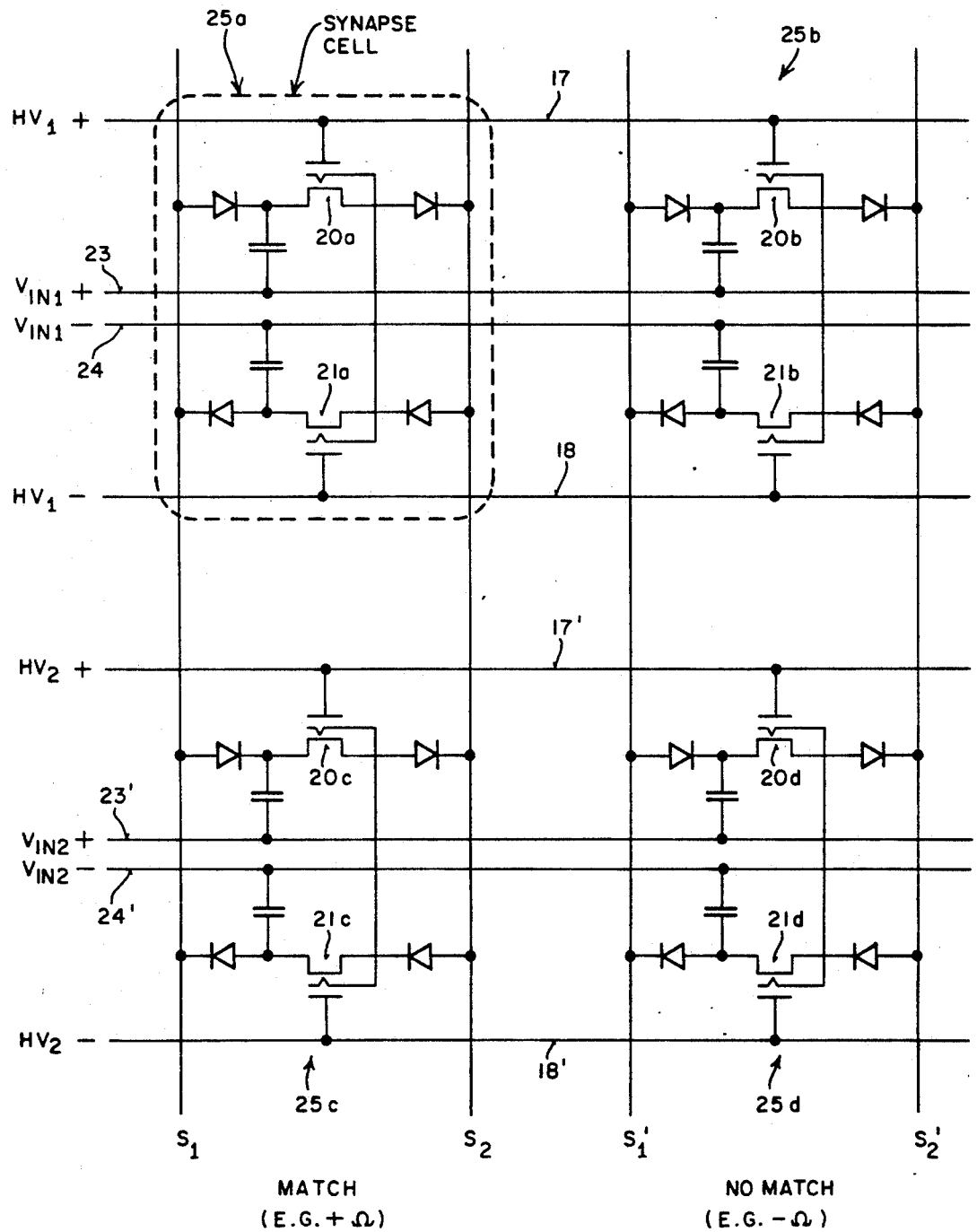
FIG_3

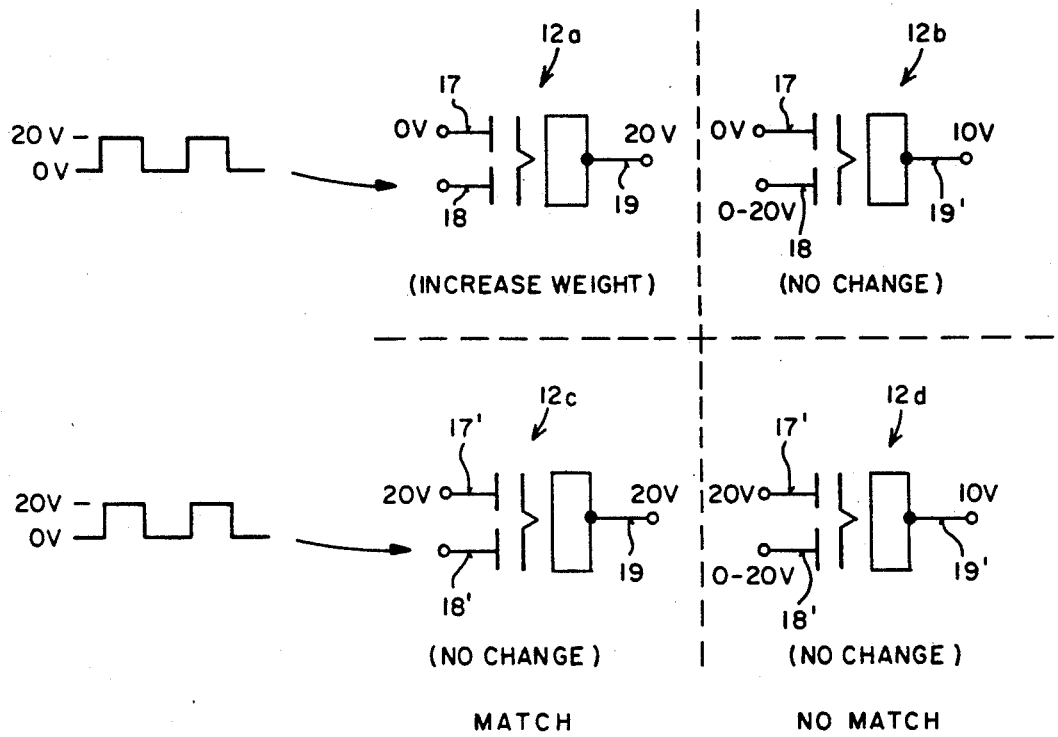
FIG_4 CYCLE 1
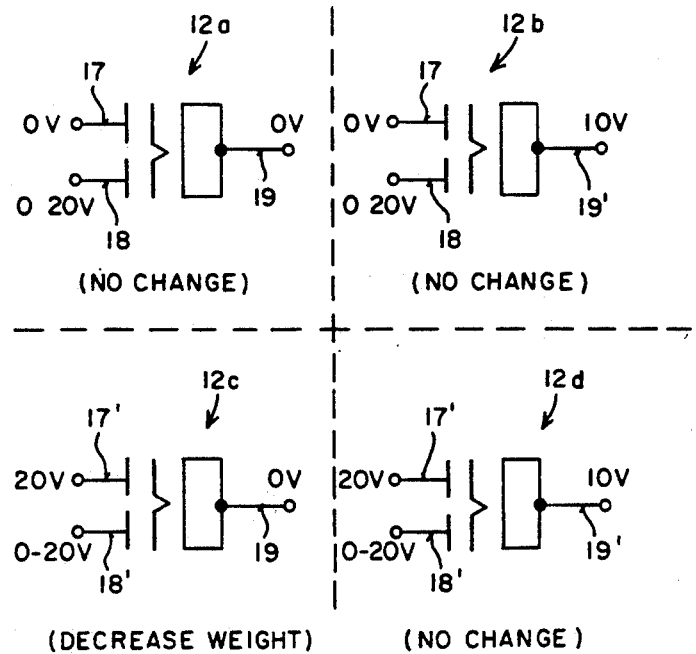
FIG_5 CYCLE 2

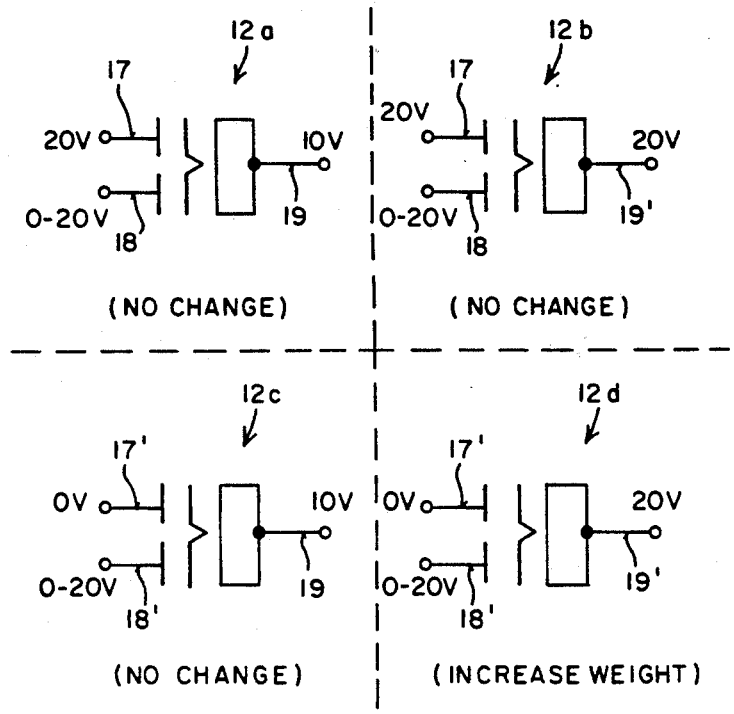
FIG_6 CYCLE 3
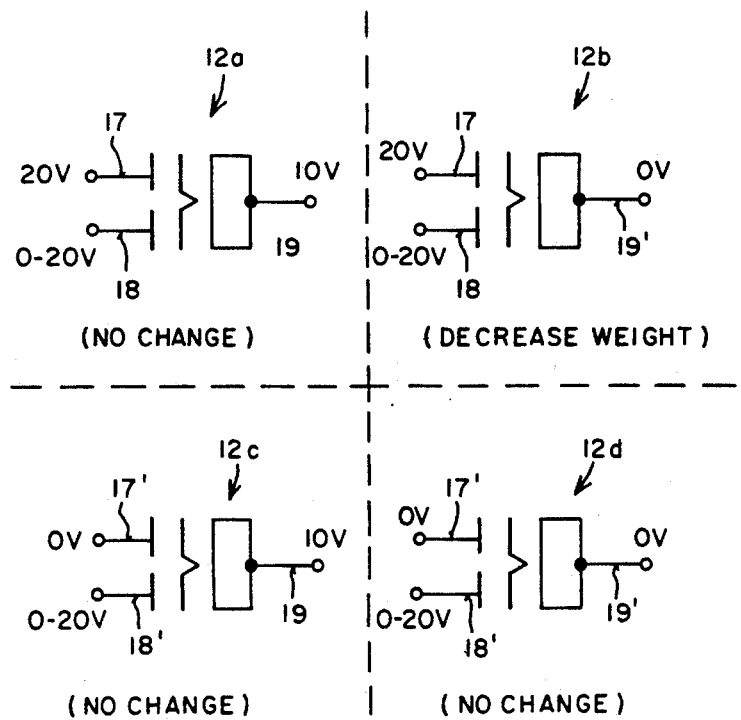
FIG_7 CYCLE 4

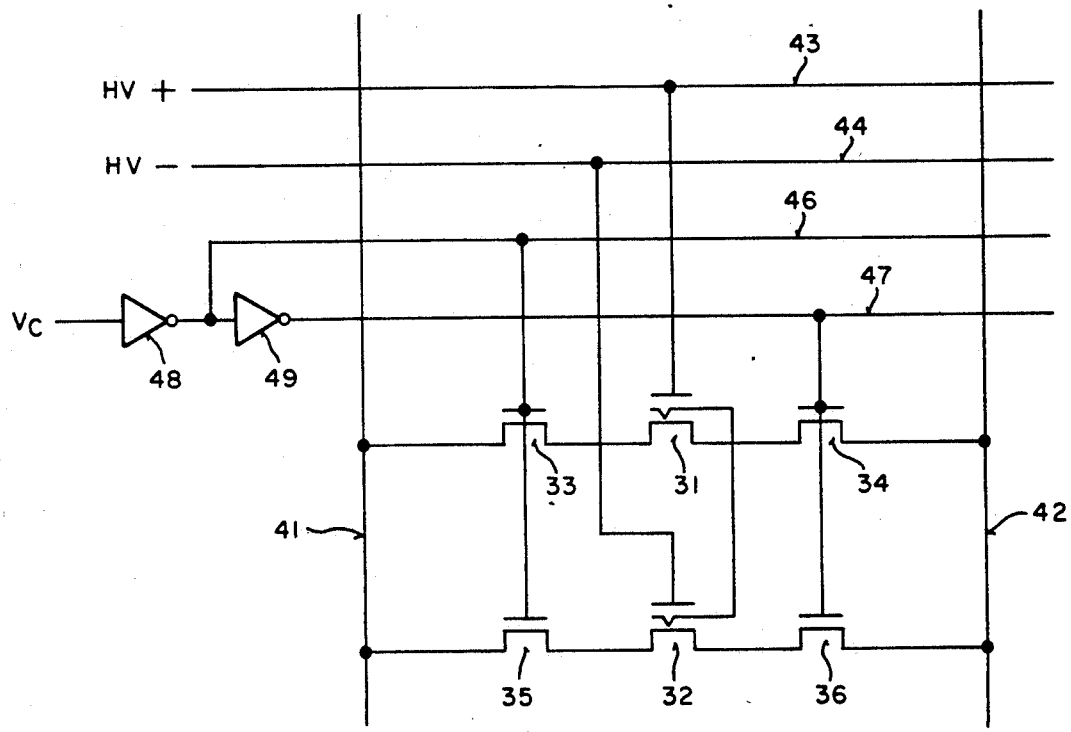
FIG_8

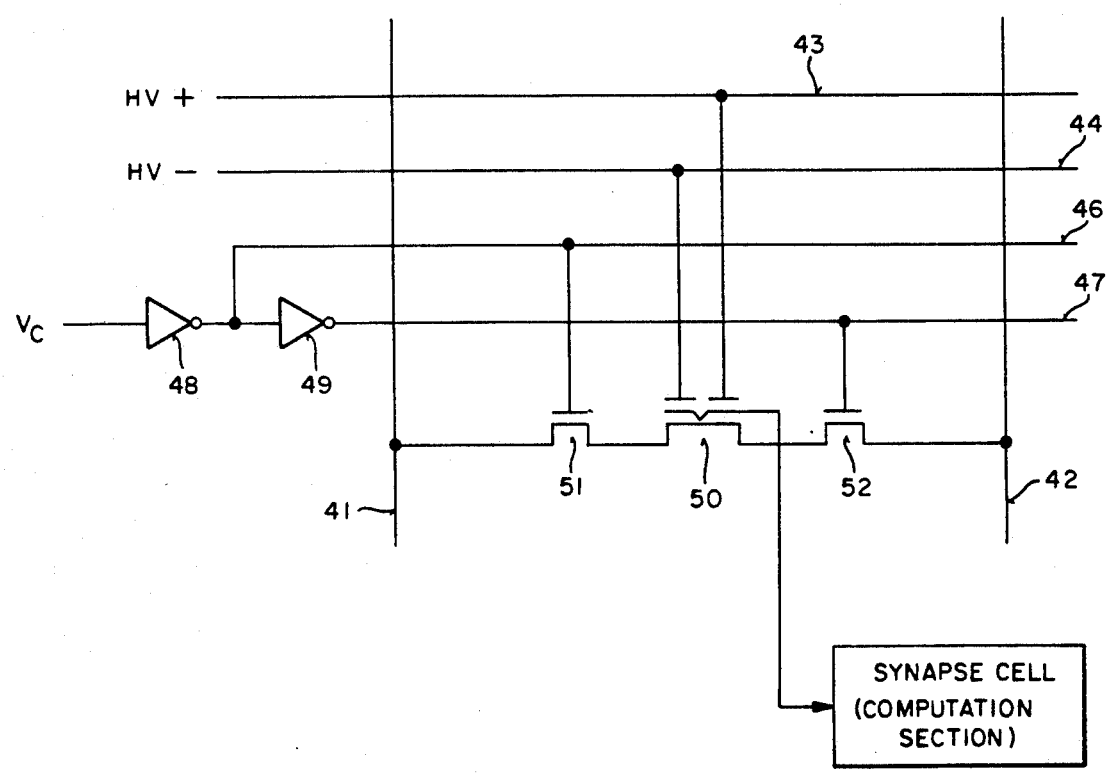
FIG_9

NEURAL NETWORK ACCOMODATING PARALLEL SYNAPTIC WEIGHT ADJUSTMENTS FOR CORRELATION LEARNING ALGORITHMS

FIELD OF THE INVENTION

The present invention is related to the field of artificial neural networks and more particularly to circuits and methods for implementing different neural learning algorithms.

BACKGROUND OF THE INVENTION

Artificial neural networks are a class of electronic circuits which attempt to achieve human-like performance in the fields of speech and image recognition via dense interconnection of simple computational elements. The neural network structures and electronic circuits comprise the computational elements in the network and are each based on our present understanding of biological nervous systems. The promise of neural networks lies in their ability to provide parallel processing of information at high computational rates, far exceeding the performance of conventional von Neumann computers which perform a program of instructions sequentially.

Neural networks generally take the form of a matrix comprised of a set of horizontal lines which cross and are coupled to a set of vertical lines. The horizontal lines simulate the functions of axons in the cortex of the brain and provide the inputs to the network. The vertical lines simulate the function of dendrites. The vertical dendrite lines are terminated at summing devices which replicate the function of the soma, otherwise known as the neuron cell body. Examples of such networks can be found in U.S. Pat. Nos. 4,950,917, 4,906,865 and 4,904,881.

Within the neural network, electronic circuits are employed to model the function of a biological synapse. Collectively, these circuits provide resistive interconnections between the horizontal and vertical lines of the network. Individual synapse cells provide a weighted electrical connection between an input and summing element (i.e., a neuron body). The relative strength of the connection often changes during the training or learning process. The strength of the interconnection is often referred to as the weight of the memory.

Electronic synapse cells have been developed for storing connection weights in the form of electrical charge. Among the various approaches to building electrical synapse circuits which have been explored, the most promising designs employ floating gate devices. In a floating gate device current flow is modulated depending on the value of a stored electrical charge. Examples of semiconductor synapse cells which employ floating gate devices for storing weights are found in U.S. Pat. Nos. 4,956,564 and 4,961,002.

One of the most intriguing aspects of neural network circuits is their learning capability. During the learning process, the network is presented with a set of training data inputs. For each set of inputs an output of the network is calculated and compared with a desired output. The weights of the synaptic connections are then adjusted according to a weight-adjustment algorithm. A wide variety of learning algorithms have been developed—the most common of these being those which employ a "local rule" or "outer product" weight update rule where the change (or sign) in the weight for a particular synapse is proportional to the sign of the input and some output-related quantity. The output-related quantity is associated with the neuron to which it is connected and is referred to in this application as the quantity $\Omega$. The interpretation of the quantity $\Omega$ depends on the particular learning algorithm employed. The local rule class of algorithms includes, for example, Hebbian, Boltzman, Mean Field, Delta Rule and Back-Propagation algorithms, among others.

One drawback with neural circuits to date has been their inability to include learning capabilities directly on chip. In other words, modern neural network circuits do not integrate the learning procedure on the same silicon chip as the network itself. In these circuits the weights are usually determined by simulation on a host computer, after which time they are down-loaded to the network. At least part of the reluctance to provide neural network implementations which allow learning to occur directly on chip has been the relative complexity of the algorithms involved, as well as the cautious approach of not committing to one particular type of algorithm. For instance, future research may reveal that certain present-day algorithms provide non-optimal learning.

As will be seen, the present invention discloses several learning circuits and a number of methods for analog, parallel implementation of a class of learning algorithms. Analog methods provide inherently higher density and computation speed than most digital implementations. Thus, the present invention provides a very dense network capable of high speed operation during the learning mode. Furthermore, by incorporating the learning on the chip itself, the weight adjustment process is enhanced by the parallelism inherent in the neural network architecture. Hence, the network of the present invention is truly adaptive in that weights can be adjusted in real-time.

SUMMARY OF THE INVENTION

The present invention covers a neural network providing correlation learning in a synapse cell. In the network of the present invention a plurality of synapse cells are either coupled to or incorporate a corresponding plurality of semiconductor circuits for parallel implementation of weight adjustments in a broad class of learning algorithms. The circuits are each coupled to an associated synapse cell. The semiconductor circuits provide the programming or learning portion of the synaptic operation, while the remainder of the synapse cell provides the computational element. In various embodiments, both portions are integral to the cell itself.

In one embodiment, each of the semiconductor circuits includes first and second floating gate devices sharing a common floating gate member. The floating gate member stores the connection weight of the synapse cell in the form of an electrical charge. A means for programming and erasing the floating gate devices comprises first and second input lines coupled to the control gates of the first and second floating gate devices, respectively. The floating gate member is programmed/erased during learning only when the first and second input lines are at substantially the same potential.

In accordance with the present invention, a method for parallel implementation of weight adjustments consists of utilizing a debiasing technique that allows parallel weight updates in a predetermined number of cycles.

Electrical charge is metered onto the floating gate member of the learning circuit by applying a high voltage pulse stream. These pulses act to debias or to induce an electric field on the floating gate device depending on their phase. In alternative embodiments, the learning circuitry includes additional control elements designed to reduce the number of cycles required for learning.

BRIEF DESCRIPTION OF THE DRAWINGS

FIG. 1 is a schematic diagram of the basic learning circuit of the present invention.

FIG. 2 is an equivalent device representation of the circuit of FIG. 1.

FIG. 3 illustrates the learning circuit of FIG. 1 incorporated into a portion of a neural network array.

FIGS. 4-7 illustrate the method of parallel implementation of a learning algorithm in accordance with the present invention.

FIG. 8 illustrates a schematic diagram of an alternative learning circuit which provides correlation learning in two cycles.

FIG. 9 is a simplified version of the circuit of FIG. 8 that provides correlation learning in two cycles using a minimal number of devices.

DETAILED DESCRIPTION

A silicon implementation of parallel learning for neural networks is described. In the following description, numerous specific details are set forth, such as specific voltages, conductivity types, configurations etc., in order to provide a thorough understanding of the present invention. It will be obvious, however, to one skilled in the art that these specific details are not essential to practicing the present invention. In other instances, well-known structures and circuits have not been shown or explained in detail in order to avoid unnecessarily obscuring the present invention.

NEURAL WEIGHT UPDATES IN FOUR CYCLES

Referring to FIG. 1 there is shown a schematic diagram of a semiconductor learning circuit 12 comprising floating gate devices 20 and 21. Both floating gate devices are shown coupled between programming bit lines 14 and 15. The control gate of device 20 is coupled to positive programming input line 17, and the control gate of device 21 is coupled to negative programming input line 18. Both devices 20 and 21 have their floating gate members coupled together (i.e., in common). All of the components illustrated in FIG. 1 may be fabricated using a conventional metal-oxide-semiconductor (MOS) process flow. (Note that the circuit schematic of FIG. 1 represents an abstraction for purposes of clarifying the function of the floating gate devices during weight adaptation.)

The electrical charge programmed onto the common floating gate represents the synaptic weight. This weight is shown in FIG. 1 being coupled to the computational portion of an individual synapse cell 10. As will be discussed in more detail shortly, semiconductor circuit 12 performs the learning function in a neural network by adaptively changing the interconnection strengths between the neurons. This interconnection strength is represented by the synaptic weight which is changed in circuit 12 by programming and erasing of floating gate devices 20 and 21.

Floating gate devices 20 and 21 are typically programmed via charge injection through a thin (on the order of 100 angstroms) oxide fabricated between the gate and either the drain or separate diffusion terminal. Relatively high voltages (e.g., 10-20 volts) are required to effect programming onto the floating gate. These same high voltages are also needed during erasing, which typically occurs via Fowler-Nordheim tunneling of charge from the floating gate to the substrate. Under normal conditions, the conductance through devices 20 and 21 is linearly proportional to the amount of charge stored on the common floating gate member. This charge is retained indefinitely (e.g., many years) because the floating gate member is usually encapsulated by an insulative dielectric layer.

Although FIG. 1 illustrates learning circuit 12 as a distinct element, separate from the computational portion of a synapse cell 10, it is appreciated that for many applications, circuit 12 is incorporated within each synapse cell of the neural network. In other words, the programming/learning and computational portions of the synaptic function are preferably integrated into a single cell which includes the basic elements depicted in FIG. 1.

By way of example, a class of electronic synapse circuits which operate by transferring charge from one summing line to another in a neural network is described in a copending patent application entitled "Charge Domain Differential Conductance Synapse Cell for Neural Networks", Ser. No. 07/812,634, filed Jan. 16, 1992, which application is assigned to the assignee of the present invention. Each of the synapse cells in the above-referenced application are easily adapted to incorporate the learning circuit and methods of the present invention.

FIG. 2 illustrates an equivalent schematic diagram of the learning circuit 12 of FIG. 1. Note that circuit 12 in FIG. 2 is depicted in a simplified form as a single field-effect device having dual control gates 17 and 18, and a floating gate member 22. Programming bit lines 14 and 15 from FIG. 1 are shown merged to a single source/drain line 19. The reason for this is that during programming and erasing both the source and drain lines of the floating gate devices are commonly coupled to the same potential. In the circuits of FIGS. 1 and 2, the relatively high voltages required for programming are coupled to the respective control gates along positive and negative programming input lines 17 and 18.

It is appreciated that it is not necessary to maintain distinct source and drain lines as shown in FIG. 1, except as is convenient from the layout of the computation sections of the cell or for testing purposes. In fact, the simplified schematic of FIG. 2 can be fabricated as a single MOS floating gate device having dual control gates, wherein the floating gate member can be routed to the computation portion of the synapse cell.

During the learning phase of its operation, the network is typically presented with a set of training examples. For each example the network's output is compared with a desired output. After comparison, the interconnection strengths of the network are adjusted according to a proper learning algorithm. In the context of the present invention, these adjustments consist of changes to the interconnection weights of each of the synapse cells within the neural network array. This is achieved by programming/erasing floating gate member 22.

By way of example, device 12 of FIG. 2 may be programmed with charge by grounding line 19 and raising lines 17 and 18 to a high positive potential (e.g., 20 volts). Under these conditions, charge accumulates on floating gate member 22, the magnitude of the accumulation being proportional to the duration that the high voltages are applied and their amplitude. It is important to recognize that the capacitances associated with the circuit of FIG. 2 are such that if one or both of input lines 17 and 18 are driven to a relatively low voltage (e.g., ~10 volts or less), then there will be an insufficient electric field to effectuate programming of floating gate device 12.

The same is true during erasing. During erasing, source/drain line 19 is coupled to a relatively high voltage (e.g., 20 volts) and input lines 17 and 18 are taken to a low voltage, preferably ground. This causes electrons present on floating gate 22 to tunnel into the substrate. However, if either line 17 or 18 has its potential raised to a level which approaches the potential on line 19, then erasing will not occur. That is, no change will occur to the programming state of floating gate 22. Under such conditions, device 12 is effectively debiased, meaning that the stored weight on floating gate 22 in unaffected. To repeat, there is no change to the programming state of device 12 whenever one of input lines 17 and 18 is low and the other is at a relatively high voltage potential. The presently invented neural network relies upon this fact during the learning phase of its operation, as is explained further below.

Now with reference to FIG. 3, there is shown a portion of a neural network comprising a plurality of synapse cells 25 arranged in rows and columns. As should be apparent, synapse cells 25 multiply the input voltage provided along input lines 23 and 24 by the weight stored within the cell. The result of this calculation is summed with the results of all of the other synapse cells in the same column, i.e., coupled along the same pair of column summing lines $S_1$ and $S_2$. Note that the particular synapse cell illustrated in FIG. 3 is of a type which transfers charge from one summing line to the other in response to pulsed voltage transitions on input lines 23 and 24. The column summing lines within the network are coupled to neural summing devices which determine when a match occurs between an input voltage pattern and a stored weight for that column of the array. The neural summing devices usually comprise an ordinary operational amplifier. By way of example, summing lines $S_1$ and $S_2$ in FIG. 3 indicate a match condition, or $+\Omega$ for that column, whereas summing lines $S_1'$ and $S_2'$ indicate no match, or $-\Omega$.

As can be seen, each of the synapse cells include a pair of floating gate devices 20 and 21 which function as a learning circuit for parallel implementation of a learning algorithm. By way of example, synapse cell 25a incorporates floating gate device 20a and 21a. Each of these floating gate devices is coupled between summing lines $S_1$ and $S_2$. Both share a common floating gate member. Floating gate device 25a has its control gate coupled to programming input wordline 17, while the control gate of floating gate device 21a is coupled to programming input wordline 18. This synaptic structure is repeated throughout the entire neural network array.

The charge coupled synapse cell illustrated in FIG. 3 works by transferring a small quanity of charge across the summing lines with each energy pulse received along either of input lines 23 and 24. The magnitude of the charge packet transferred is, of course, dependent on the programmed voltage threshold of the learning devices 20 and 21. To better understand how parallel learning of a particular input/output match is implemented according to the present invention, consider the following example.

Assume that the match conditions shown in FIG. 3 exist. That is, column lines $S_1$ and $S_2$ indicate a match condition whereas column lines $S_1'$ and $S_2'$ indicate no match. During the learning process, the summing lines of each column are driven to either a very high, a low, or an intermediate voltage potential depending on whether a particular synapse cell is to be programmed, erased or no change is to occur to the weight stored therein. For the situation in FIG. 3, driving the summing lines in a particular column to the same potential means that the diode devices are effectively shorted. This means that the potential on the source and drain regions of devices 20 and 21 is essentially the same.

Continuing with the above example, FIG. 4 illustrates the first learning cycle for the neural network of FIG. 3. For the simplified diagram of FIG. 4, device 12a (corresponding to synapse cell 25a in FIG. 3) is targeted for a weight increase, while the remaining devices 12b–12d are to undergo no change in their programming thresholds. To program device 12a, common lines $S_1$ and $S_2$ (represented by line 19 in FIG. 4) are coupled to relatively high voltage potential, e.g., ~20 volts. Programming input wordline 17 is grounded and programming input wordline 18 receives a high voltage pulse stream which alternately transitions between 0 and 20 volts. Whenever input programming line 18 is low (e.g., 0 volts) erasing occurs. This means that due to the high electric field which exists between the control gate and substrate of device 12a, electrons tunnel from the floating gate into the substrate. With less charge present on the floating gate member, the conductance of device 12a is increased, thereby increasing the connection strength in the network. Note that erasing occurs only as long as programming input line 18 is held at a low potential.

Whenever line 18 transitions to a high voltage potential, device 12a is effectively debiased. In other words, with lines 18 and 19 at a high voltage and line 17 grounded, the electric field experienced by the floating gate is sufficiently weakened that erasing (or programming) can no longer occur. For this condition, no change occurs to the programming threshold of device 12a. In this manner, the electrical charge is metered onto the floating gate by applying high voltage pulses in the form of a programming input. The high voltage pulses present at line 18 have a frequency and amplitude which can be made independent of the neural output (or $\Omega$), and can thus be a global signal for the entire array. The frequency is preferably modulated by the magnitude of the desired input signal, regardless of sign. In this case, line 18 may run parallel to the input lines. The sign of the input signal controls the DC potential at line 17. Line 18 can alternatively run perpendicular to the input lines (e.g., parallel to the summing lines) in which case the frequency is preferably modulated by the magnitude of the neuron output (or $\Omega$), once again independent of sign.

It is important to recognize that during the first learning cycle only one of the four cells shown in the example has its weight altered. The remaining cells are prohibited from changing their voltage threshold during this cycle by means of appropriate control over the column summing and input programming line potentials.

Consider device 12b, which shares the same programming input wordline with device 12a. Device 12b is inhibited from being either programmed or erased by the application of an intermediate voltage potential (e.g., 10 volts) to the summing lines represented by line 19'. Application of an intermediate voltage means that even when programming input line 18 transitions to a low voltage, the electric field strength experienced by the floating gate is insufficient to cause tunneling of electrons to the substrate. Thus, device 12b undergoes no change in its programming state during the first learning cycle.

Now consider what happens to the synaptic devices in the next row in the array during the first cycle. Device 12c in FIG. 4 also receives a pulse stream input to programming input line 18'. Although line 19 is coupled to a high voltage potential, the connection weight of device 12c is not changed during cycle 1 because a similarly high potential (e.g., 20 volts) is coupled to programming input wordline 17'. The result of coupling line 17' to a high voltage means that device 12c is also debiased during this learning cycle. Similarly, device 12d receives no change to its stored weight condition by virtue of the fact that it shares column summing line 19' with device 12b. Recall that line 19' is maintained at an intermediate potential during the first cycle of the parallel learning method.

FIG. 5 illustrates the applied voltages to the array of FIG. 3 during the second cycle of the learning process. Once again, input programming wordlines 18 and 18' receive a high voltage pulse stream which alternately transitions between a low and a high programming potential, e.g., from 0 to 20 volts. Column summing line 19 is coupled to ground, while column summing line 19' is held at an intermediate voltage of approximately 10 volts. Input programming wordline 17 is grounded to debias synapse cells 12a and 12b. Device 12c has its input programming wordline 17' raised to a high positive potential so that whenever input wordline 18' transitions high, the floating gate of device 12c is programmed. This causes a decrease in the weight of the connection associated with that synapse cell.

Notice that during cycle 2, device 12b is also debiased by the application of an intermediate voltage to summing line 19'. As explained earlier, the frequency of the applied pulse stream on input programming wordline 18' can be made to correspond to the magnitude of the applied input or the neuron output (i.e., $\Omega$).

FIG. 6 illustrates the pattern of applied programming voltages during cycle 3. This time, device 12d is targeted for a weight increase (i.e., erasing). This is accomplished by grounding wordline 17' and by raising column summing line 19' to a high potential of approximately 20 volts. As was the case during cycle 1, application of a high voltage pulse stream to programming wordline 18' causes the floating gate member of device 12d to become erased of charge whenever wordline 18' is grounded. Device 12c, which is in the same row as device 12d, is inhibited from changing its weight by application of the intermediate voltage to summing line 19. Similarly, devices 12a and 12b receive no change to their programming states: device 12a receiving an intermediate voltage along column line 19, and device 12b having its wordline 17 coupled to a high positive potential.

The final learning cycle, cycle 4, is illustrated in FIG. 7. For this cycle, device 12b is programmed, which results in a decreased connection weight in the corresponding synapse cell. As before, the learning devices located in the adjacent column (i.e., devices 12a and 12c) are debiased during this cycle by the application of an intermediate voltage coupled to column summing line 19. Device 12d is likewise inhibited from increasing or decreasing its weight since input programming wordline 17' is grounded. Thus, parallel learning is achieved by the present invention in four cycles. The conditions for implementing parallel learning in four cycles are summarized in Table I below.

TABLE I

|  | CYCLE 1 | CYCLE 2 | CYCLE 3 | CYCLE 4 |
|---|---|---|---|---|
| HV INPUT (line 17) |  |  |  |  |
| for + INPUT | 0 v | 0 v | 20 v | 20 v |
| for − INPUT | 20 | 20 | 0 | 0 |
| Column Voltage |  |  |  |  |
| for + $\Omega$ | 20 | 0 | 10 | 10 |
| for − $\Omega$ | 10 | 10 | 20 | 0 |

The net effect after the four cycles, on any synapse in the array, is that if the input to that synapse and $\Omega$ (which in this case represents the match condition of the neuron output) are both the same polarity, then the weight of that synapse is incremented; otherwise the weight is decremented. Furthermore the intensity of the weight increase or decrease can be made dependent upon the intensity of the input or the intensity of $\Omega$.

Practitioners in the art will appreciate that not only is the present invention extendable to larger networks, but also to networks that are organized differently. For example, the present invention is ideally suited to networks that employ multiple hidden layers. Another alternative is to make the source/drain voltage across the learning field-effect devices dependent on the strength of the output of the network. For instance, during erasing, the column summing lines may vary in voltage between 18 and 20 volts, depending on the strength of the output, while both input wordlines remain grounded. It is appreciated that each of these alternative embodiments are well within the spirit and scope of the present invention.

WEIGHT UPDATES IN TWO CYCLES

Parallel learning can also be implemented in a neural network in two cycles rather than four. The tradeoff for reducing the number of learning cycles is that more devices are required, however, the basic idea still relies upon recurrent debiasing.

FIG. 8 illustrates a learning circuit which achieves parallel learning in two cycles rather than four. The embodiment of FIG. 8 again includes floating gate devices 31 and 32, sharing a common floating gate member. The control gate of device 31 is coupled to input programming wordline 43, whereas the control gate of device 32 is coupled to input programming wordline 44. These wordlines function in the same manner as wordlines 17 and 18 in the embodiments of FIGS. 1–7. In addition, each of the floating gate devices has associated with it ordinary n-channel field-effect devices 33 and 34, each shown coupled in series between device 31 and one of the associated bit lines (i.e., column summing lines). By way of example, device 34 is coupled between bit line 42 and device 31. Device 33 is coupled between bit line 41 and device 31. Likewise device 32 is coupled in series with n-channel field-effect devices 35 and 36. In the configuration of FIG. 8, devices 33 and 35 each are connected to wordline 46, while devices 34 and 36 are connected to wordline 47. A control voltage signal $V_c$ drives wordlines 46 and 47; wordline 47 being the inverse of 46 by virtue of inverter 49.

The operation of the learning circuit of FIG. 8 is similar to that of the previous embodiments, except that field-effect devices 33-36 function to split bit lines 41 and 42 from floating gate devices 31 and 32. This is done so that different voltages can be applied to programming bit lines 41 and 42, depending on the match condition (i.e., $\Omega$) for the associated column line without the possibility of incurring short circuit currents. FIG. 8 shows one possibility—wherein line 41 is grounded and line 42 is taken to a high positive potential of 20 volts for a match condition. The situation is reversed for a no-match condition.

During the first cycle of operation, the input $V_c$ is at a logical high level. This means that line 46 is low and line 47 is high. In this condition, devices 33 and 35 are off, thereby disconnecting devices 31 and 32 from bit line 41. At the same time, devices 34 and 36 are on, which couple bit line 42 to the floating gate devices. For those columns of the array in which a match is indicated, line 42 is utilized to couple a high voltage to floating gate devices 31 and 32 to selectively increase synaptic weights. Note that the operation of input programming wordlines 43 and 44 is the same as described for earlier embodiments. Of course, the operation of both programming wordlines depends on the polarity of the input. Input signal $V_c$ is independent of input or match ($\Omega$) conditions.

During the second cycle, the input control signal $V_c$ is in the opposite state; that is, $V_c$ is logically low. For this situation, line 46 is high and line 47 low such that devices 33 and 35 are on and devices 34 and 36 are off. This means that line 41 is now coupled to the floating gate devices 31 and 32, and line 42 is effectively disconnected. Again, input programming wordlines 43 and 44 operate as before, with one of the wordlines receiving a high voltage pulse stream, which preferably transitions between 0 and 20 volts.

The overall effect on the neural network after the two weight change cycles is to increase the weight of those synapses whose input and $\Omega$ have the same polarity, while decreasing the weight of those with different polarities. The function of control signal $V_c$ is to separate in time the erasing events from the programming events. Note that in certain applications the programming/erasing events may require different conditions and can thus be better controlled when performed in two separate cycles.

Analogous to FIG. 2, the circuit of FIG. 8 can be simplified to that of FIG. 9 without loss of function. In FIG. 9, floating gate devices 31 and 32 (see FIG. 8) have been merged into dual control gate device 50. One of the control gates is coupled to line 43 and the other is coupled to line 44. The floating gate member of device 50 is connected to the computation section of the synapse cell, which may be distinct from the learning section. Additionally, in the case of FIG. 9, field-effect devices 33 and 35 can be merged into a single MOS device 51, while devices 34 and 36 are consolidated into MOS device 52. Thus, the embodiment of FIG. 9 offers the advantage of a reduced device count.

Although the present invention has been described in conjunction with certain embodiments, it is appreciated that the invention may be implemented in a variety of other ways. Consequently, it is to be understood that the particular embodiments shown and described by way of illustration are in no way intended to be considered limiting. Reference to the details of these embodiments is not intended to limit the scope of the claims which themselves recite only those features regarded as essential to the invention.

What is claimed is:

1. A neural network including a plurality of synapse cells each of which computes the product of an input voltage and a connection weight, and a corresponding plurality of semiconductor circuits for parallel implementation of weight updates according to a learning algorithm, each of said circuits being coupled to an associated one of said synapse cells, wherein each of said circuits comprises:

first and second floating gate devices having a common floating gate member for storing the connection weight of said associated synapse cell in the form of an electrical charge;

means for programming/erasing said devices, said means comprising first and second input lines coupled to the control gates of said first and second floating gate devices, respectively, said floating gate member being programmed/erased during learning when said first and second input lines are at substantially the same potential.

2. The neural network of claim 1 wherein said plurality of cells are arranged in an array of rows and columns and said programming/erasing means further comprises a pair of programming bit lines, each of said first and second floating gate devices being coupled across said pair of bit lines.

3. The neural network of claim 2 wherein each said circuit is integrated within said associated synapse cell, and said programming bit lines comprise the summing lines of a column of said array, said summing lines being coupled to a neural summing device.

4. The neural network of claim 3 wherein the connection weight of said associated synapse cell is adjusted according to the method comprising the steps of:

selecting said synapse cell from a particular row and column of said array;

coupling said pair of said summing lines connected to said synapse cell to a first reference potential;

coupling said first input line of said row to a second reference potential; and applying a voltage pulse stream to said second input line of said row at a frequency which corresponds to the magnitude of the input voltage coupled to said synapse cell.

5. The neural network of claim 4 wherein said connection weight is increased in said associated synapse cell whenever the amplitude of the voltage pulse is in said pulse stream and said first reference potential are at a relatively high potential, and said second reference potential is sufficiently low to erase said floating gate member.

6. The neural network of claim 5 wherein said connection weight is decreased in said associated synapse cell whenever said second reference potential is at a relatively high potential and said first reference potential is sufficiently low so as to program said floating gate member.

7. The neural network of claim 1 wherein said learning algorithm employs a local rule or outer product weight update rule.

8. The neural network of claim 7 wherein said algorithm is selected from the group consisting of Hebbian, Boltzman, Mean Field, Delta Rule, and Back-propagation algorithms.

9. A neural network comprising an array of synapse cells, each computing the dot product of an input voltage and a connection weight, said array being organized such that inputs to said cells are applied through rows of wordlines with the computational results of said cells being summed along pairs of column lines, each of said cells comprising a device means for parallel learning in a predetermined number of cycles, said device means including a means for storage of said weight in the form of an electrical charge, and a weight adjusting means comprising a pair of control lines, at least one of said control lines coupling a high voltage pulse stream to said device means, for either increasing, decreasing or causing no change to said connection weight independent of adjustments made to other of said cells in said array.

10. The neural network of claim 9 wherein said pulse stream operates at a frequency representative of the magnitude of the input to said neural network.

11. The neural network of claim 9 wherein said device means comprises a non-volatile semiconductor memory device having dual control gates and a floating gate, each of said control gates being coupled to one of said control lines and wherein said connection weight is stored on said floating gate.

12. The neural network of claim 9 wherein said device means comprises a pair of floating gate devices having a common floating gate member, each of said floating gate devices being coupled between a pair of said column lines and each having its control gate coupled to one of said control lines.

13. The neural network of either claim 11 or 12 wherein the weight of a selected synapse cell is increased according to the method comprising the steps of:
coupling one of said control lines to a first reference potential;
coupling the pair of control lines connected to said selected cell to a second reference potential, said second reference potential being relatively higher than said first reference potential;
applying said voltage pulse stream to the other of said control lines; the voltage pulses of said stream transitioning between said first reference potential and in said second reference potential such that when said other control line is at said first reference potential, said floating gate member is erased of charge, when said other control line is at said second reference potential the charge stored on floating gate member is not altered.

14. The neural network of either claim 11 or 12 wherein the weight of a selected synapse cell is decreased according to the method comprising the steps of:
coupling one of said control lines to a first reference potential;
coupling a pair of column lines connected to said selected cell to a second reference potential, said second reference potential being relatively lower than said first reference potential;
applying a high voltage pulse stream to the other of said control lines, the voltage pulses of said pulse stream transition between said first reference potential and said second reference potential such that when said other control line is at said first reference potential, said floating gate member is programmed, and when said other control line is at said second reference potential the charge stored on said floating gate member is not altered.

15. The method of claim 13 wherein selected cells in different columns other than that of said selected cell are prevented from being erased/programmed by application of an intermediate potential to the pairs of column lines associated with said different columns, said intermediate potential being higher than said first reference potential and lower than said second reference potential such that erasing/programming is inhibited upon the application of said voltage pulse stream.

16. The neural network of claim 14 wherein the weight of a selected synapse cell is decreased according to the method comprising the steps of:
coupling one of said control lines to a first reference potential;
coupling a pair of column lines connected to said selected cell to a second reference potential, said second reference potential being relatively lower than said first reference potential;
applying a high voltage pulse stream to the other of said control lines, the voltage pulses of said pulse stream transition between said first reference potential and said second reference potential such that when said other control line is at said first reference potential, said floating gate member is programmed, and when said other control line is at said second reference potential the charge stored on said floating gate member is not altered.

17. The neural network of claim 9 wherein said predetermined number of cycles equals four.

18. The neural network of claim 11 wherein said device means further comprises first and second field-effect transistors coupled in series with one of said floating gate devices between said pair of column lines, and third and fourth field-effect devices coupled in series with other of said floating gate devices between said pair of column lines, said first and third field-effect devices having their gates coupled to a first logic level and said second and fourth field-effect devices having their gates coupled to a second logic level, said second logic level being the inverse of said first logic level; and
a means for digitally switching said first and second logic levels from high-to-low and vice versa, thereby enabling the increasing and decreasing of the connection weights of multiple cells within the same column simultaneously, said switching means selectively decoupling one of said column lines and coupling the other of said column lines from said floating gate devices.

19. The neural network of claim 18 wherein said predetermined number of cycles equals two.

* * * * *